United States Patent
Amoroso et al.

(10) Patent No.: US 10,141,852 B2
(45) Date of Patent: Nov. 27, 2018

(54) LLC SECONDARY SIDE CONTROL WITH ADAPTIVE ON-TIME

(71) Applicant: Texas Instruments Incorporated, Dallas, TX (US)

(72) Inventors: Antonio Amoroso, Tremestieri Etneo (IT); Filippo Marino, Tremestieri Etneo (IT); Salvatore Giombanco, Cassaro (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/395,795

(22) Filed: Dec. 30, 2016

(65) Prior Publication Data

US 2018/0191253 A1   Jul. 5, 2018

(51) Int. Cl.
   *H02M 3/335* (2006.01)
   *H02M 3/337* (2006.01)

(52) U.S. Cl.
   CPC ..... *H02M 3/33515* (2013.01); *H02M 3/3376* (2013.01); *H02M 3/33523* (2013.01); *H02M 3/33538* (2013.01); *H02M 3/33546* (2013.01)

(58) Field of Classification Search
   CPC ......... H02M 3/33515; H02M 3/33546; H02M 3/33538; H02M 3/3376; H02M 3/33523
   See application file for complete search history.

(56) References Cited

U.S. PATENT DOCUMENTS

| | | | | |
|---|---|---|---|---|
| 7,599,198 B2* | 10/2009 | Tao | ................... | H02M 3/33592 363/17 |
| 7,633,780 B2* | 12/2009 | Endo | ..................... | H02M 7/217 363/127 |
| 9,236,809 B2* | 1/2016 | Wang | ................ | H02M 3/33592 |
| 9,350,258 B2* | 5/2016 | Choi | .................. | H02M 3/33592 |
| 2010/0103710 A1* | 4/2010 | Reddy | ............... | H02M 3/33592 363/127 |
| 2010/0188871 A1* | 7/2010 | Kim | .................. | H02M 3/33592 363/21.03 |
| 2017/0310231 A1* | 10/2017 | Lee | ................... | H02M 3/33592 |

OTHER PUBLICATIONS

Fairchild/on Semiconductor information sheet, www.fairchildsemi.com; "FAN6208 Secondary-Side Synchronous Rectifier Controller for LLC Topology"; 2010 Fairchild Semiconductor Corporation, FAN6208, Rev. 1.0.5; 19 pages.
ST life.augmented, datasheet-production data; www.st.com; "SRK2000A Synchronous Rectifier Smart Driver for LLC Resonant Converters"; Dec. 2013; 19 pages.
ST life.augmented, datasheet-production data; www.st.com; "SRK2001 Adaptive Synchronous Rectification Controller For LLC Resonant Converter"; May 2015; 22 pages.

* cited by examiner

*Primary Examiner* — Kyle J Moody
(74) *Attorney, Agent, or Firm* — Andrew Viger; Charles A. Brill; Frank D. Cimino (57) ABSTRACT

A circuit for use in an LLC converter to control diode conduction time includes a secondary side controller, the secondary side controller configured to monitor voltage, measure a diode conduction time for the LLC converter, in response to determining that the diode conduction time is greater that a target time, increase the on-time for the first switch, and in response to determining that the diode conduction time is less than a target time, decrease the on-time for the first switch.

20 Claims, 4 Drawing Sheets

LLC SECONDARY SIDE CONTROL WITH ADAPTIVE ON-TIME

FIELD OF THE INVENTION

This invention relates generally to improving efficiency in circuits and, more particularly, to improving efficiency by controlling diode conduction time.

BACKGROUND OF THE INVENTION

Diode conduction losses can have a significant impact on the overall efficiency of an LLC converter. These losses are especially pronounced in low output voltage applications. In an effort to reduce conduction losses, designers have created circuits which replace the rectifier diodes with switches, typically in the form of transistors. However, diode conduction losses still occur with the transistors. To achieve optimum results (i.e., minimize diode conduction losses), the on-time of the transistors are carefully controlled, because the on-time of the transistors is related to the diode conduction time. Current approaches to regulating transistor on-time rely on sensing the forward current in the circuit. These approaches, however, are less than optimal due to the tight constraints that must be satisfied and the potential for parasitic losses that decrease the precision of the design.

BRIEF DESCRIPTION OF THE DRAWINGS

Embodiments of the invention are illustrated in the figures of the accompanying drawings in which.

SUMMARY

According to aspects of the disclosure, systems, methods, and circuits are useful in controlling diode conduction time. In some aspects of the disclosure, a circuit includes an LLC converter and a secondary side controller, the secondary side controller configured to monitor voltage, measure a diode conduction time for the LLC converter, in response to determining that the diode conduction time is greater that a target time, increase the on-time for the first switch, and in response to determining that the diode conduction time is less than a target time, decrease the on-time for the first switch.

DETAILED DESCRIPTION

As previously discussed, controlling the diode conduction time of transistors in an LLC converter is important to maximize the efficiency of the LLC converter. Too long a diode conduction time causes increased losses on the rectifier diode, while too short a conduction time can cause current inversion on the secondary side of the LLC converter. While approaches do exist for controlling diode conduction time in an LLC circuit, the current approaches are costly, challenging to implement, and sensitive to parasitic losses. Consequently, a need exists for improved methods and circuitry for controlling diode conduction time of an LLC converter.

Embodiments of the inventive subject matter seek to provide methods, systems, and apparatuses that better control the diode conduction time of an LLC converter. In some embodiments, an adaptive algorithm is used to control diode conduction time by modulating on-time for the transistors. A secondary side controller can implement the algorithm. More specifically, the secondary side controller monitors a voltage on the secondary side of the LLC converter and determines, based on the voltage, the diode conduction time for a switching cycle of a transistor in the LLC converter and changes, if necessary, the on-time of the transistors for the next switching cycle. In some embodiments, the secondary side controller compares the diode conduction time to a target time (e.g., a static or dynamic time period) and adjusts the on-time for the transistors during the next switching cycle based on the comparison with the target. For example, if the diode conduction time is greater than the target time, the secondary side controller increases the on-time for the transistor for the next switching cycle. Increasing the on-time for the transistor for the next switching cycle decreases the diode conduction time for the transistor at the next switching cycle. If the diode conduction time is less than the target time, the secondary side controller can decrease the on-time of the transistor during the next switching cycle. Decreasing the on-time for the transistor for the next switching cycle increases the diode conduction time for the transistor during the next switching cycle. An example circuit including a secondary side controller capable of controlling diode conduction time is discussed with reference to FIGS. 1 and 3, while example operations for controlling diode conduction time are discussed with reference to FIG. 4.

In addition to controlling diode conduction time by manipulating the on-time of the transistors on the secondary side of the LLC converter, in some embodiments the secondary side controller can also minimize the impact and longevity of current inversion events by quickly adjusting the on-time of the transistors. For example, when a current inversion event is detected (e.g., by monitoring the voltage), the secondary side controller can quickly turn the transistor off. In an effort to prevent repetitive current inversion events, the secondary side controller can use the on-time from the previous switching cycle as an on-time for the next switching cycle. That is, if a current inversion event is detected after a duration of time t=X while the high side transistor is on, the secondary side controller can immediately turn the high side transistor off and use t=X as the on-time for the low side transistor during the next switching cycle. By reducing the on-time for the next switching cycle in this manner, repetitive current inversion events can be avoided and the system can quickly be realigned to a new switching frequency. A flow chart of example operations for mitigating current inversion events is discussed with reference to FIG. 5.

Figure 1:
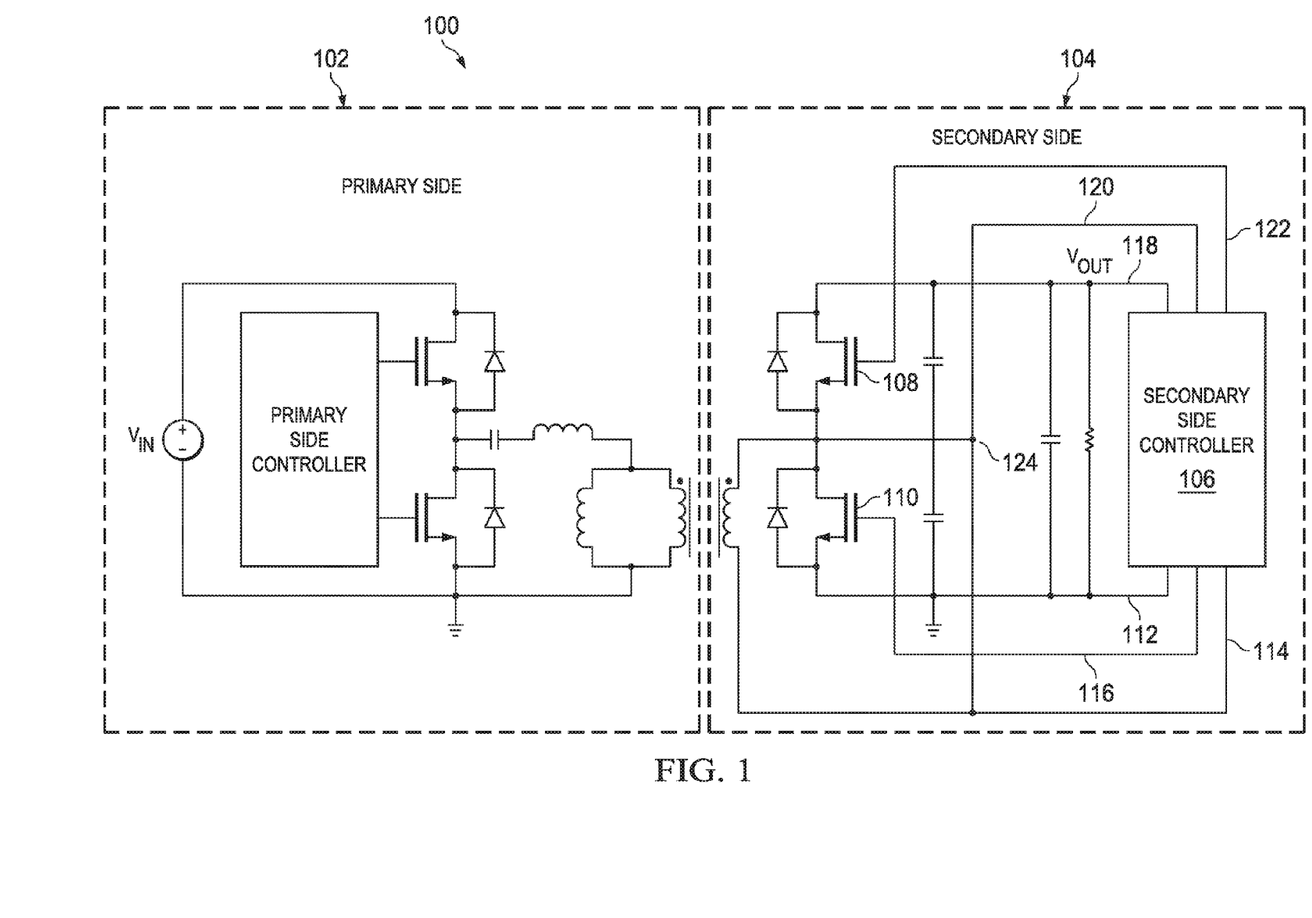
FIG. 1 depicts a circuit 100 including a secondary side controller 106 that controls diode conduction time by manipulating on-time of switches on a secondary side 104 of the circuit 100, according to some embodiments.

The discussion of FIG. 1 describes an example circuit including a secondary side controller capable of controlling diode conduction time.

FIG. 1 depicts a circuit 100 including a secondary side controller 106 that controls diode conduction time by manipulating on-time of switches on a secondary side 104 of the circuit 100, according to some embodiments. The circuit 100 is an LLC converter having a primary side 102 and a secondary side 104. The LLC converter depicted in FIG. 1 utilizes synchronous rectification and, accordingly, includes two transistors, a first transistor 110 and a second transistor 108. Specifically, the first transistor 110 operates as a low side switch for the secondary side 104 of the LLC converter and the second transistor 108 operates as a high side switch for the secondary side 104 of the LLC converter. A secondary side controller 106 includes the hardware and logic used to drive the first transistor 110 and the second transistor 108 and implement an algorithm to control diode conduction time for the first transistor 110 and the second transistor 108 by manipulating the on-time of the first transistor 110 and the second transistor 108.

With regard to the first transistor 110, the secondary side controller 106 monitors both the voltage at the switching node 124, as indicated by connection 114, and the voltage at the low side of the secondary side 104 of the LLC converter (shown as ground in the secondary side 104 depicted in FIG. 1), as indicated by the connection 112. Accordingly, the secondary side controller 106 determines diode conduction time for the first transistor 110 based on the monitored voltage at the switching node 124 and the monitored voltage at ground. Diode conduction for the first transistor 110 occurs when the switching node 124 voltage is less than the voltage at ground.

With regard to the second transistor 108, the secondary side controller 106 monitors both the voltage at the switching node 124, as indicated by connection 120, and the output voltage ("$V_{out}$"), as indicated by connection 118. Accordingly, the secondary side controller 106 determines diode conduction time for the second transistor 108 based on the monitored voltage at the switching node 124 and the monitored voltage at $V_{out}$. Diode conduction for the second transistor 108 occurs when voltage at the switching node 124 is greater than $V_{out}$.

The secondary side controller 106 drives the first transistor 110 and the second transistor 108 via connection 116 and connection 122, respectively. Based on the diode conduction time, the secondary side controller 106 manipulates the on-time of the first transistor 110 and the on-time of the second transistor 108 to control the conduction time for the first transistor 110 and the diode conduction time for the second transistor 108. Because the on-time for a transistor and the diode conduction time for the transistor are related, manipulating the on-time for the transistor impacts the diode conduction time of the transistor. More specifically, if the on-time for a transistor is increased, the diode conduction time for the transistor decreases. If the on-time for a transistor is decreased, the diode conduction time for the transistor increases.

In some embodiments, the secondary side controller 106 compares the diode conduction time to a target (i.e., a target time period). The target can be static (i.e., a predetermined time that remains constant regardless of conditions associated with the LLC converter) or dynamic (i.e., a time period that varies based on conditions associated with the LLC converter). If the secondary side controller 106 determines that the diode conduction time for the first transistor 110 is greater than the target during a current switching cycle, the secondary side controller 106 can increase the on-time for the first transistor 110 during the next switching cycle. If the secondary side controller 106 determines that the diode conduction time for the first transistor 110 is less than a target during the current switching cycle, the secondary side controller 106 can decrease the on-time for the first transistor 110 during the next switching cycle. The secondary side controller 106 performs similar operations with respect to the second transistor 108 (i.e., if the diode conduction time of the second transistor 108 is greater than the target during the current cycle, the secondary side controller 106 can increase the on-time of the second transistor 108 during the next switching cycle, and if the diode conduction time of the second transistor 108 is less than the target during the current switching cycle, the secondary side controller 106 can decrease the on-time of the second transistor 108 during the next switching cycle). In some embodiments, the secondary side controller 106 determines the on-time for the first transistor 110 and the on-time for the second transistor 108 independently. That is, the secondary side controller 106 determines the on-time for the first transistor 110 at the next switching cycle based on the diode conduction time of the first transistor 110 during the previous switching cycle, and the secondary side controller 106 determines the on-time for the second transistor 108 at the next switching cycle based on the diode conduction time of the second transistor during the previous switching cycle. Alternatively, the secondary side controller 106 can determine an on-time for the first transistor 110 at the next switching cycle based on the diode conduction time of the second transistor 108 during the previous switching cycle and vice versa.

Figure 2:
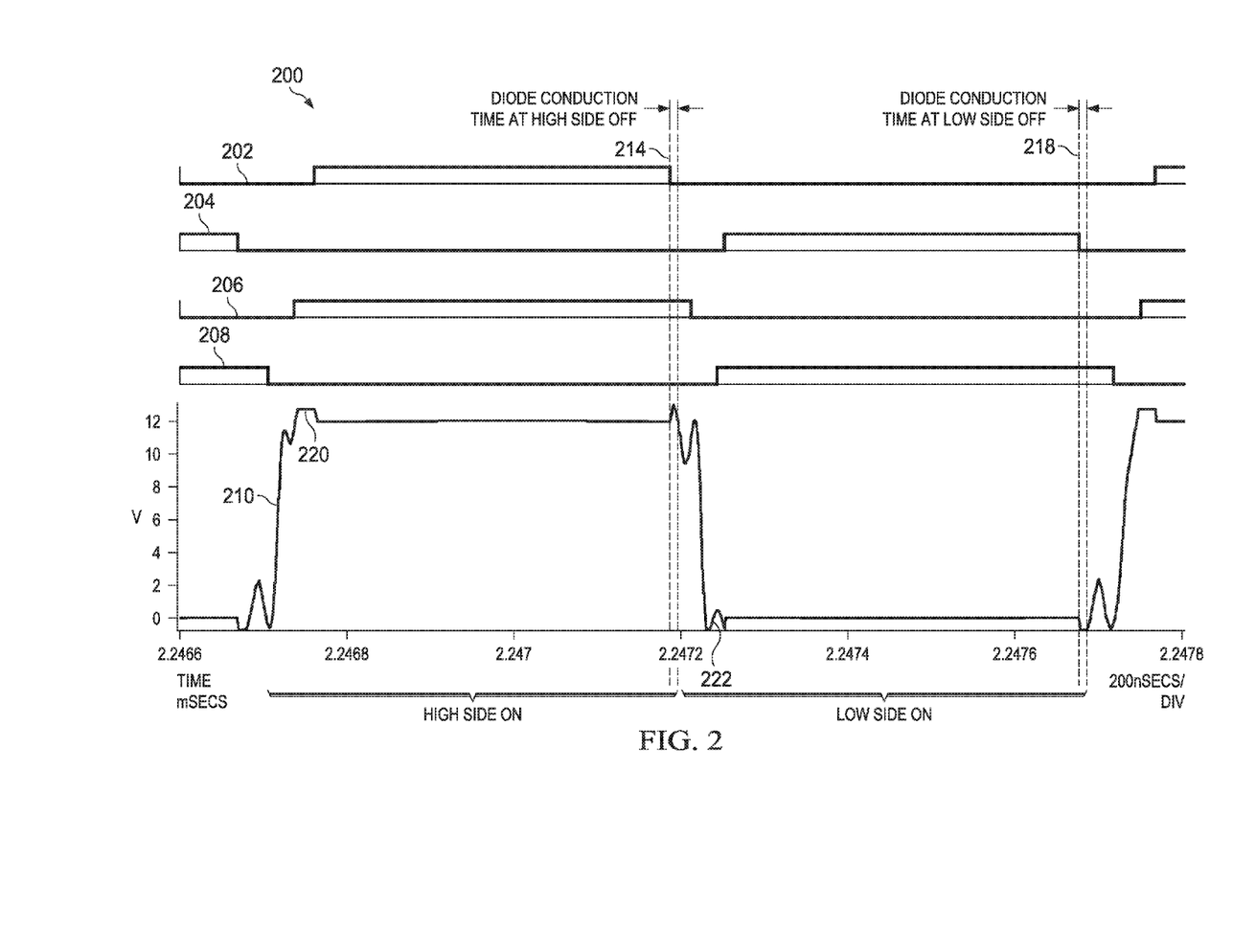
FIG. 2 is a chart 200 depicting waveforms of an example LLC converter, according to some embodiments.

While the discussion of FIG. 1 provides an overview of an example circuit including a secondary side controller that can control diode conduction time, the discussion of FIG. 2 describes plotted waveforms that depict diode conduction time.

FIG. 2 is a chart 200 depicting waveforms of an example LLC converter, according to some embodiments. A voltage waveform 210, plotted on the lower portion of the graph, depicts voltage as measured at the switching node of the secondary side of the LLC converter over time. The top four waveforms depict the state of four transistors or switches in the LLC converter: secondary high side waveform 202 depicts the state of the high side transistor on the secondary side of the LLC converter, secondary low side waveform 204 depicts the state of the low side transistor on the secondary side of the LLC converter, primary high side waveform 206 depicts the state of the high side transistor on the primary side of the LLC converter, and primary low side waveform 208 depicts the state of the low side transistor on the primary side of the LLC converter. As can be seen from the chart 200, when the high side transistor of the secondary side is on, the voltage at the switching node is approximately 12 volts, according to the voltage waveform 210. Consequently, the output voltage of the secondary side of the LLC converter is approximately 12 volts. As can be seen from the chart 200, when the low side transistor of the secondary side is on, the voltage as the switching node is approximately 0 volts, as indicated by the voltage waveform 210.

As previously discussed, diode conduction occurs on the high side when the switching node voltage is higher than the output voltage. In practice, diode conduction will occur on the high side when the switching node voltage is higher than the output voltage plus an offset due to the forward voltage of the high side transistor. However, for simplicity, diode conduction will be said to occur on the high side when the switching node voltage is higher than the output voltage. Consequently, diode conduction time for the high side transistor occurs when the voltage waveform 210 passes approximately 12 volts. As can be seen in the voltage waveform 210, diode conduction for the high side transistor occurs twice during each switching cycle: 1) when the high side transistor is turned on, as indicated by peak 220, and 2) when the high side transistor is turned off, as indicated by lines 214. The diode conduction time for the high side transistor is the length of time that the switching node voltage is greater than the output voltage (i.e., the voltage waveform 210 is above approximately 12 volts).

As previously discussed, diode conduction occurs on the low side when the switching node voltage is less than ground. In practice, diode conduction will occur on the low side when the switching node voltage is less than ground minus an offset due to the forward voltage of the low side transistor. However, for simplicity, diode conduction will be said to occur on the low side when the switching node voltage is lower than ground. Consequently, diode conduction for the low side transistor occurs when the voltage waveform 210 falls below approximately 0 volts. As with the high side transistor, diode conduction for the low side transistor occurs twice during each switching cycle: 1) when the low side switch is turned on (i.e., at $T_{ON}$), as indicated by trough 222, and 2) when the low side transistor is turned off (i.e., at $T_{OFF}$), as indicated by lines 218. The diode conduction time for the low side transistor is the length of time that the switching node voltage is below approximately 0 volts (i.e., the voltage waveform 210 is below approximately 0 volts).

Figure 3:
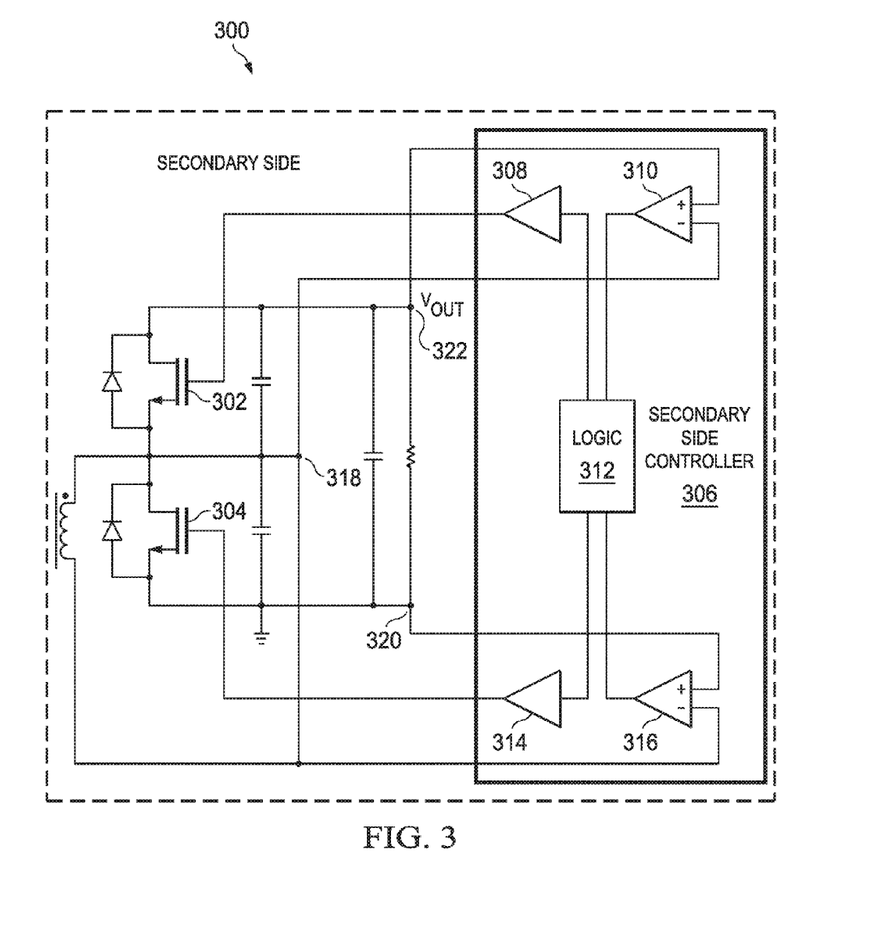
FIG. 3 is a detailed view of a secondary side 300 of a circuit including a secondary side controller 306 that controls diode conduction time by manipulating the on-time of switches on the secondary side 300 of the circuit, according to some embodiments.

While FIG. 2 provides as visual representation of diode conduction and the discussion of FIG. 2 provides more detail regarding diode conduction, the discussion of FIG. 3 describes a specific embodiment of a circuit including a secondary side controller capable of controlling diode conduction time in an LLC converter.

FIG. 3 is a detailed view of a secondary side 300 of a circuit including a secondary side controller 306 that controls diode conduction time by manipulating the on-time of switches on the secondary side 300 of the circuit, according to some embodiments. The secondary side includes a first transistor 304, a second transistor 302, and the secondary side controller 306, among other components not individually numbered. The secondary side controller 306 includes a first driver 314, a second driver 308, a first comparator 316, a second comparator 310, and logic 312. The secondary side controller 306 receives, via the first comparator 316 and the second comparator 310, information from the LLC converter. The secondary side controller 306 uses this information to determine on-times for the first transistor 304 and the second transistor 302. The secondary side controller 306 drives the first transistor 304 and the second transistor 302 via the first driver 314 and the second driver 308, respectively.

In the example circuit provided in FIG. 3, the first comparator 316 receives as an input a voltage at a switching node 318 of the secondary side of the LLC converter ("a switching node voltage") and a voltage at the low side 320 of the LLC converter (i.e., ground in the example circuit). Diode conduction for the first transistor occurs when the switching node voltage is less than the voltage at ground 320. The logic 312 determines the diode conduction time of the first transistor 304 based on an output from the first comparator 316. In one embodiment, the logic 312 includes a clock mechanism that is triggered when diode conduction begins and ends. In such an embodiment, the logic 312 determines the diode conduction time of the first transistor 304 by measuring the time period during which diode conduction occurs for the first transistor 304. The logic 312 compares the diode conduction time of the first transistor 304 with a target and manipulates the on-time for the first transistor 304 at the next switching cycle based on this comparison. If the diode conduction time for the first transistor 304 is shorter than the target, the logic 312 decreases the on-time for the first transistor 304 for the next switching cycle. If the diode conduction time for the first transistor 304 is longer than the target, the logic 312 increases the on-time for the first transistor 304 during the next switching cycle. Finally, if the diode conduction time for the first transistor 304 is equal to the target, the logic 312 will use the same on-time for the first transistor 304 at the next switching cycle. In some embodiments, the logic 312 adjusts the on-time from one switching cycle to the next in steps. For example, if the step is 0.01 ms and the diode conduction time for the first transistor 304 was longer than the target, the logic 312 will increase the on-time for the first transistor 304 for the next switching cycle by 0.01 ms, (i.e., one step). In other embodiments, the logic 312 can determine a suitable time to increase or decrease the on-time for the first transistor on a scale having seemingly infinite resolution (e.g., the secondary side controller can use a mathematical model or formula to calculate the increase or decrease in on-time for the next cycle). After determining the on-time for the first transistor 304 for the next switching cycle, the logic 312 drives the first transistor 304 for the determined on-time during the next switching cycle via the first driver 314.

The second comparator 310 receives as an input the switching node voltage and a voltage at an output 322 of the LLC converter (i.e., the output voltage). Diode conduction for the second transistor 302 occurs when the switching node voltage is greater than the output voltage. The logic 312 determines the diode conduction time of the second transistor 302 based on an output from the second comparator 310. In one embodiment, the logic 312 includes a clock mechanism that is triggered when diode conduction begins and ends. In such an embodiment, the logic 312 determines the diode conduction time of the second transistor 302 by measuring the time period during which diode conduction occurs for the second transistor 302. The logic 312 compares the diode conduction time of the second transistor 302 with a target and manipulates the on-time for the second transistor 302 at the next switching cycle based on this comparison. In some embodiments, the target for the second transistor 302 is the same as the target for the first transistor 304. In other embodiments, the target for the second transistor 302 may be different than that of the first transistor 304, or one target may be static while the other is dynamic. If the diode conduction time for the second transistor 302 is shorter than the target, the logic 312 decreases the on-time for the second transistor 302 for the next switching cycle. If the diode conduction time for the second transistor 302 is longer than the target, the logic 312 increases the on-time for the second transistor 302 during the next switching cycle. Finally, if the diode conduction time for the second transistor 302 is equal to the target, the logic 312 will use the same on-time for the second transistor 302 at the next switching cycle. In some embodiments, the logic 312 adjusts the on-time from one switching cycle to the next in steps. Alternatively, or in addition to adjusting the on-time in steps dependent upon the circumstances, the logic 312 can adjust the on-time for the second transistor 302 on a scale having seemingly infinite resolution. After determining the on-time for the second transistor 302 for the next switching cycle, the logic 312 drives the second transistor 302 for the determined on-time during the next switching cycle via the second driver 308.

Figure 4:
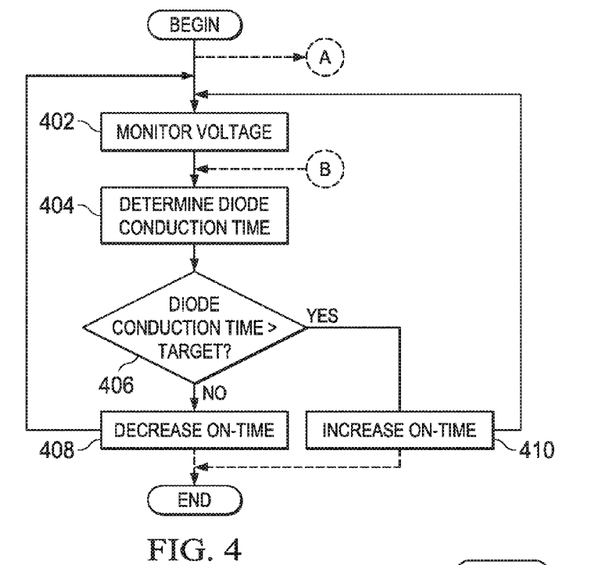
FIG. 4 is a flow chart depicting example operations for controlling diode conduction time by manipulating on-time of switches on a secondary side of a circuit, according to some embodiments.

While the discussion of FIG. 3 describes an example circuit including a secondary side controller for controlling diode conduction time in an LLC converter, the discussion of FIG. 4 describes example operations for controlling diode conduction time in an LLC converter.

FIG. 4 is a flow chart depicting example operations for controlling diode conduction time by manipulating on-time of switches on a secondary side of a circuit, according to some embodiments. The flow beings at block 402.

At block 402, voltage is monitored. For example, a secondary side controller can monitor voltage at one or more points on the secondary side of a circuit. With respect to an LLC converter, the secondary side controller can monitor voltage with respect to a high side switch and a low side switch on the secondary side of the LLC converter. Specifically, the secondary side controller can monitor the output voltage and the switching node voltage for the high side switch, and the low side voltage and the switching node voltage for the low side switch. The flow continues at block 404.

At block 404, diode conduction time is determined. For example, the secondary side controller can determine the diode conduction time. With respect to an LLC converter, the secondary side controller can determine diode conduction for the high side switch, the low side switch, or both the high side switch and the low side switch. The secondary side controller can determine diode conduction time for the high side switch by determining an amount of time that diode conduction occurs for the high side switch. The secondary side controller can determine diode conduction time for the low side switch by determining an amount of time that diode conduction occurs for the low side switch. Diode conduction time can be determined either when a switch is turned on (i.e., at $T_{ON}$), a switch is turned off (i.e., at $T_{OFF}$), or both. The flow continues at decision diamond 406.

At decision diamond 406, it is determined whether diode conduction time is greater than a target. For example, the secondary side controller can determine whether diode conduction time is greater than the target. The target can be either static or dynamic as well as predetermined (e.g., selected for the circuit) or determined during operation (e.g., determined by the circuit). With respect to an LLC converter, the secondary side controller can determine whether diode conduction time is greater than the target for the high side switch, the low side switch, or both the high side switch and the low side switch. The high side switch and low side switch can have the same target or different targets. If the diode conduction time is less than the target, the flow continues at block 408. If the diode conduction time is greater than the target, the flow continues at block 410.

As previously discussed, if the diode conduction time is less than the target at decision diamond 406, the flow continues at block 408. At block 408, the on-time is decreased. For example, the secondary side controller can decrease the on-time. In some embodiments, the on-time is decreased for the next switching cycle. In some embodiments, with respect to an LLC converter, on-time can be decreased for the high side switch and the low side switch independently. For example, if at decision diamond 406 it is determined that diode conduction time for the low side switch was less than the target and that diode conduction time for the high side switch was greater than the target, the on-time for the low side switch can be decreased at the next switching cycle of the low side switch and the on-time for the high side switch can be increased at the next switching cycle for the high side switch. Alternatively, on-time of one or both of the high side switch and the low side switch can be adjusted based on either of the high side switch and the low side switch. For example, if at decision diamond 406 it is determined that the diode conduction time for the high side switch is greater than the target, the on-time for the low side switch can be increased at the next switching cycle of the low side switch (i.e., the on-time for the low side switch at the next switching cycle is dependent upon the diode conduction time of the high side switch during the previous switching cycle). The on-time can be decreased using any suitable approach. For example, the on-time can be decreased from cycle-to-cycle in single step increments, multiple step increments, on a continuously variable scale, or some combination of these approaches. For example, if the diode conduction time is less than the target by more than a threshold (e.g., a multiple of ten steps, a predetermined time, etc.), the on-time can be adjusted by a multiple of two steps during each cycle until the on-time is no longer more than the target by the threshold. In some embodiments, on-time is continuously adjusted throughout operation and from block 408 the flow continues back to block 402 to repeat the process and again adjust the on-time. Alternatively, the flow can end after block 408.

As previously discussed, if it is determined that the diode conduction time is greater than the target at decision diamond 406, the flow continues at block 410. At block 410 the on-time is decreased for the next switching cycle. As with the operations at block 408, on-time can be determined independently for each of the high side switch and the low side switch, or the on-time for one or both of the high side switch and the low side switch can be dependent on one or both of the diode conduction time for the high side switch and the low side switch. Additionally, the on-time can be increased in single step increments, multiple step increments, on a continuously variable scale, or some combination of these approaches. In some embodiments, on-time is continuously adjusted throughout operation of the circuit, and from block 408 the flow continues back to block 402 to repeat the process and again adjust the on-time. Alternatively, the flow can end after block 410.

Figure 5:
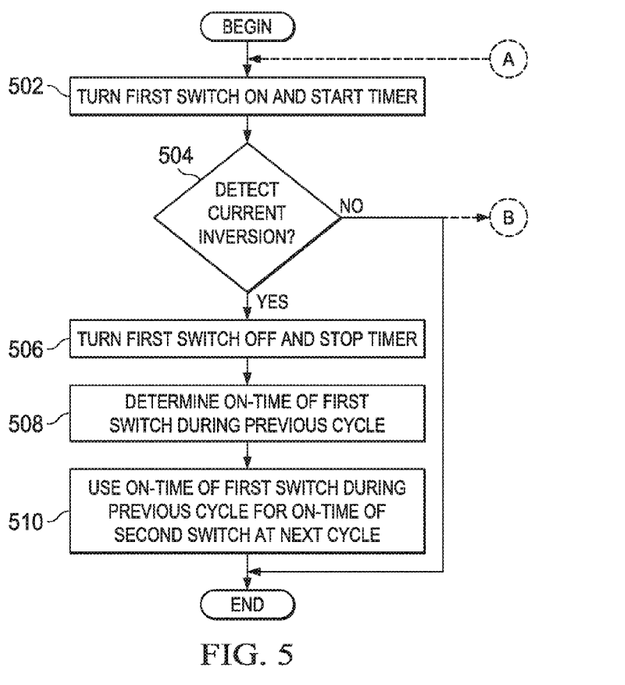
FIG. 5 is a flow chart depicting example operations for mitigating the effects of current inversion in a circuit having a secondary side controller, according to some embodiments.

FIG. 5 is a flow chart depicting example operations for mitigating the effects of current inversion in a circuit having a secondary side controller, according to some embodiments. The flow begins at block 502.

At block 502, a first switch is turned on and a timer is started. For example, a secondary side controller can turn the first switch on and start the timer. In some embodiments, the secondary side controller starts the timer and turns the switch on simultaneously so that the timer can measure an on-time for the first switch. The flow continues at decision diamond 504.

At decision diamond 504, it is determined if current inversion is detected. For example, the secondary side controller can determine if current inversion is detected (i.e., if a current inversion event has occurred). On the secondary side of an LLC converter, current inversion occurs with respect to the high side when the switching node voltage drops below the output voltage and occurs on the low side when the switching node exceeds the low side voltage. If current inversion is not detected while the first switch is on, the flow ends and the timer stops. In an LLC converter, if current inversion is not detected while the first switch is on, after the first switch is turned off the flow returns to block 502 and the example operations of FIG. 5 are performed with respect to a second switch. If current inversion is detected, the flow continues at block 506.

At block 506, the first switch is turned off and the timer is stopped. For example, the secondary side controller can turn the switch off and stop the timer. Put simply, when current inversion is detected, the secondary side controller turns the switch off to prevent the current inversion event from continuing. In some embodiments, the secondary side controller turns the switch off and stops the timer simultaneously. Starting and stopping the timer at as close to the same time with the turning on and off of the first switch as possible allows for an accurate measurement of the on-time for the first switch, as performed during the operations of block 508.

At block 508, the on-time of the first switch during the previous cycle is determined. For example, the secondary side controller determines the on-time for the first switch during the previous cycle. In this discussion, the previous cycle refers to the cycle in which the current inversion event occurred. The secondary side controller can determine the on-time for the first switch based on the time measured by the timer. In some embodiments, there may be a lag or lead between the switch turning on and the timer starting, the switch turning off and the timer stopping, or both. In such embodiments, the secondary side controller can account for these lags or leads. The flow continues at block 510.

At block 510, the on-time for the first switch during the previous cycle is used for the on-time of the second switch at the next cycle. For example, the secondary side controller can use the on-time determined at block 508 (i.e., the on-time for the first switch during the previous cycle) as the on-time for the second switch during the next cycle (i.e., the cycle that follows the previous cycle). In circuits having only one switch, these operations can be performed for the first switch during the next cycle of the first switch.

Although FIG. 5 depicts these operations as ending after block 510, this is not always the case. As one example, the flow can continue to block 502 after block 510 and the operations can be repeated for the next cycle with the second switch. That is, the first switch can be turned on and it can be determined if a current inversion even is detected. If a current inversion event is detected the flow can continue and use an on-time of the second switch as the on-time for the first switch at a cycle subsequent the next cycle. The operations can repeat in this manner, alternating between the first switch and the second switch, until current inversion events no longer occur.

Additionally, in some embodiments, the example operations of FIG. 4 can be augmented with the example operations of FIG. 5, as indicated by "A" and "B." For example, the operations of FIG. 4 can be performed to control the diode conduction time by modulating the on-time for the switches. After the secondary side controller turns the switch on and starts the timer, the secondary side control can also monitor the voltage for diode conduction current inversion events. Consequently, the flow can proceed at "A" from the operations of FIG. 4 to the operations of FIG. 5. If current inversion is not detected, the flow continues back to the operations of FIG. 4 at "B" and the timer is stopped. In the case that current inversion is not detected, the operations of FIG. 4 do not change significantly from that described with reference to FIG. 4. However, when a current inversion event occurs, the operations of FIG. 5 can be performed, as described with respect to FIG. 5, until there is no longer a current inversion event. At that point the flow can continue back to the operations of FIG. 4 at "B" to resume normal behavior (i.e., the behavior of the circuit when current inversion events are not occurring).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A circuit for use in an LLC converter with an LLC primary side and an LLC secondary side, the circuit comprising:
    a secondary side controller configured:
        to monitor, on the secondary side of the LLC converter, a voltage;
        to determine, based on the voltage, a diode conduction time for a first switch in the LLC converter;
    the secondary side controller further configured:
        to increase the on-time for the first switch in the LLC converter in response to determining that the diode conduction time for the first switch is greater than a target time; and
        to decrease the on-time for the first switch in the LLC converter in response to determining that the diode conduction time for the first switch is less than a target time.

2. The circuit of claim 1, wherein the circuit is configured to implement the increase of the on-time for the first switch and the decrease of the on-time for a second switch at a next switching cycle for the first switch.

3. The circuit of claim 2, wherein the circuit is configured to implement the decrease or the increase of the on-time for the first switch by one step at the next switching cycle for the first switch.

4. The circuit of claim 1, wherein the secondary side controller is further configured:
    to determine, based on the voltage, that current inversion has occurred;
    to turn the switch off in response to a determination that current inversion has occurred;
    to determine an on-time for the first switch prior to the current inversion; and
    to adjust, based on the on-time for the first switch, an on-time for a second switch.

5. The circuit of claim 4, wherein the on-time for the second switch is the on-time for the first switch.

6. The circuit of claim 4, wherein the on-time for the second switch is for a switching cycle immediately following turn off of the first switch.

7. The circuit of claim 1, wherein the diode conduction time for the first switch is determined at turn off of the first switch.

8. The circuit of claim 1, wherein the diode conduction time for the first switch is determined at turn on of the first switch.

9. A method for adjusting on-time for one or more switches in an LLC converter, the method comprising:
    monitoring, on a secondary side of an LLC converter, voltage;
    determining, based on the voltage, a diode conduction time for a first switch in the secondary side of the LLC converter;
    in response to determining that the diode conduction time for the first switch is greater than a target time,
        increasing the on-time for the first switch in the secondary side of the LLC converter; and
    in response to determining that the diode conduction time for the first switch is less than a target time,
        decreasing the on-time for the first switch in the secondary side of the LLC converter.

10. The method of claim 9, wherein the increasing the on-time for the first switch and the decreasing the on-time for the first switch are performed at a next switching cycle for the first switch.

11. The method of claim 10, wherein the on-time for the first switch is one of decreased and increased by one step at the next switching cycle for the first switch.

12. The method of claim 9, further comprising:
 determining, based on the voltage, that current inversion has occurred;
 turning off the first switch in response to determining that current inversion has occurred;
 determining, based on the turning off the first switch, an on-time for the first switch prior to the current inversion; and
 adjusting, based on the on-time for the first switch, an on-time for a second switch.

13. The method of claim 12, wherein the on-time for the second switch is the on-time for the first switch.

14. The method of claim 12, wherein the on-time for the second switch is for a switching cycle immediately following the turning off of the first switch.

15. A system for LLC conversion, comprising:
 an LLC converter having a primary side and a secondary side;
 the LLC converter including a secondary side controller configured;
  to monitor, on the secondary side of the LLC converter, a voltage;
  to measure, based on the voltage, a diode conduction time for a first switch in the LLC converter;
  the secondary side controller further configured
   to increase the on-time for the first switch in the LLC converter in response to determining that the diode conduction time for the first switch is greater than a target time; and
   to decrease the on-time for the first switch in the LLC converter in response to determining that the diode conduction time for the first switch is less than a target time.

16. The system of claim 15, wherein the circuit is configured to implement the increase of the on-time for the first switch and the decrease of the on-time for a second switch at a next switching cycle for the first switch.

17. The system of claim 16, wherein the circuit is configured to implement the decrease or the increase of the on-time for the first switch by one step at the next switching cycle for the first switch.

18. The system of claim 15, wherein the secondary side controller is further configured:
 determine, based on the voltage, that the current inversion has occurred;
 to turn the switch off in response to a determination that current inversion has occurred;
 to determine and on-time for the first switch prior to the current inversion; and
 to adjust, based on the on-time for the first switch, an on-time for a second switch.

19. The system of claim 18, wherein the on-time for the second switch is the on-time for the first switch.

20. The system of claim 18, wherein the on-time for the second switch is for a switching cycle immediately following turn off of the first switch.

* * * * *